Figure 1:
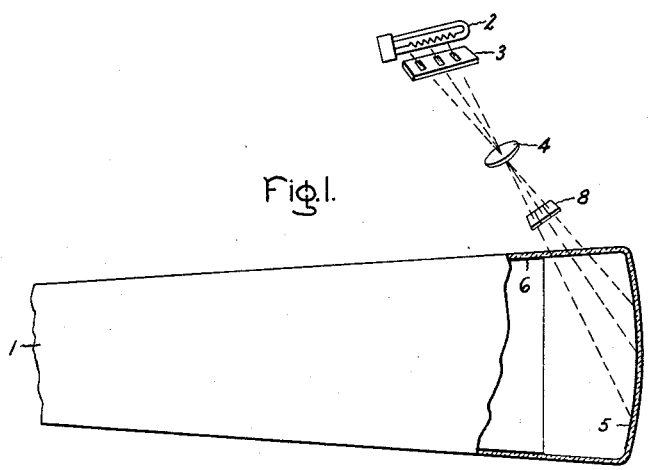

April 13, 1943.   A. BIGALKE   2,316,550
OSCILLOSCOPE SCALE
Filed May 20, 1941

Inventor:
Alfred Bigalke,
by Harry E. Dunham
His Attorney.

Patented Apr. 13, 1943

2,316,550

UNITED STATES PATENT OFFICE 2,316,550

OSCILLOSCOPE SCALE

Alfred Bigalke, Berlin, Germany, assignor to General Electric Company, a corporation of New York Application May 20, 1941, Serial No. 394,337
In Germany November 1, 1939

3 Claims. (Cl. 88—24)

My invention relates to electron beam instruments and concerns particularly devices such as cathode ray oscilloscopes.

Where responsiveness to very rapid fluctuations in measured or indicated conditions is necessary, instruments have come into use in which an electron beam, such as a cathode ray stream is caused to impinge on a screen composed of fluorescent material. An arrangement is provided such as electrostatic deflecting plates or an electromagnetic deflecting coil for deflecting the beam in response to variations in a condition to be indicated or measured. The movement of the light spot at the intersection of the cathode ray stream and the fluorescent screen accordingly provides the indication or measurement. If means are provided for deflecting the electron beam on a transverse axis also, a luminous curve may be produced on the fluorescent screen which represents the wave shape of a recurrent phenomenon to be examined. For any of these purposes it is desirable to have at least a zero line and, in most cases, a scale or set of coordinate lines, in order that the significance of the image produced on the cathode ray screen may be better evaluated. It is not uncommon to etch a suitable scale or set of coordinate lines on the outside surface of the glass wall carrying the fluorescent screen. A transparent scale plate in front of the screen has also been used. However, since the fluorescent screen must be on the inner surface of the cathode ray tube parallax is introduced by the fact that the spot produced by the cathode ray beam is not in the same plane as the scale markings.

It is an object of my invention to provide an electron beam indicating instrument with a scale arrangement avoiding parallax and providing for easy interchangeability of scales and convenient movement, adjustment and calibration thereof and which is adapted for use with multi-beam tubes as well as single beam tubes and permits the provision of a plurality of scales with different characteristics or divisions.

Other and further objects and advantages of my invention will become apparent as the following description proceeds.

In carrying out my invention in its preferred form I project one or more scales or portions thereof, or zero marks, or other reference-line means onto the inner surface of the fluorescent screen of a cathod ray oscilloscope from a light source or an illuminated optical object located outside the oscilloscope tube. The object may take the form of an illuminated slit or aperture or a plurality of slits or apertures so arranged as to form a zero mark or a set of scale divisions.

A better understanding of the invention will be afforded by the following description considered in connection with the accompanying drawing and those features of the invention which are believed to be novel and patentable will be pointed out in the claims appended hereto.

Figure 2:
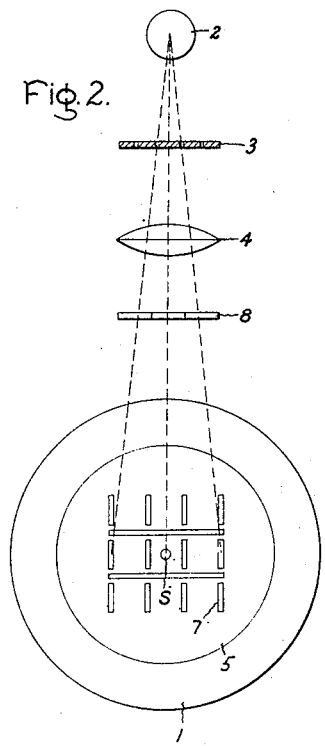
Figure 3:
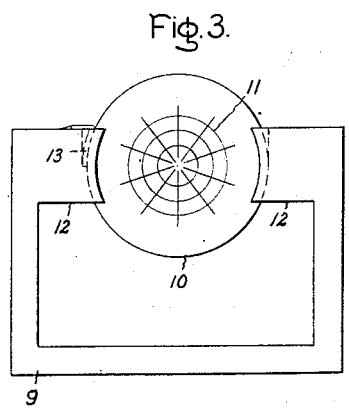

In the drawing Fig. 1 is a side view of one embodiment of my invention, Fig. 2 is an end view, and Fig. 3 is a view of a removable scale. Like reference characters are utilized throughout the drawing to designate like parts.

In Fig. 1 there is shown in fragmentary form a cathode ray tube I consisting of an evacuated envelope of transparent material such as glass. It will be understood that such a tube includes suitable electrodes for emitting an electron beam such as a cathode ray stream directed longitudinally along the interior of the tube and means for deflecting the beam in response to a current or a voltage. These parts are not shown since they are conventional and do not form a part of my invention. For providing a scale or other reference line means, I employ a light source 2, an optical object 3, which may be illuminated by the light source, and suitable means such as a lens 4 for projecting an image of the illuminated object 3 on the activated inner surface 5 of a fluorescent screen lying on the inner surface of the end wall of the cathode ray oscilloscope tube I. The fluorescent screen consists of a coating of suitable material well known to those skilled in the art which fluoresces or becomes luminous where the cathode ray impinges thereon so that deflection of the cathode ray beam in response to variations in a measured or indicated quantity produces movement of a light spot (represented at S in Fig. 2) along the inner surface 5 of the fluorescent screen. In order to exclude undesired light and increase the brilliance of the light spot S, the inner or outer surfaces of the oscilloscope tube I may be coated with a suitable opaque material, such as colloidal graphite known by the trade name "aquadag," to form the opaque film 6. However, an opening is left in the film 6 to permit the illuminated image of the object 3 to be projected through a portion of the side wall of the tube on to the inner surface of the fluorescent screen 5, the light source 2 and the optical object 3 being outside the tube I. Any distortion which may be incident to projecting the scale-producing light beams through the wall of the tube 1 is taken into consideration in the design of the object 3.

The optical object 3 may be in the form of a slit or aperture, or a plurality of slits or apertures, which are illuminated by the lamp 2, so that slits or beams of light pass through the object 3 and are focused by the lens 4 on the fluorescent screen surface 5 to form luminous images which serve as reference lines or marks. My invention does not of course exclude an arrangement in which the optical object 3 is illuminated from the opposite surface and the reflected or illuminated image of the solid parts thereof is projected on the fluorescent screen surface 5. It will be understood that the focal length of the lens 4 and the location of the optical elements should be so chosen as to form a sharp image of the configuration of parts of the optical object 3. If lengthwise slits, as well as crosswise slits, are provided in the object 3, a set of rectangular coordinate lines 7 is projected on the fluorescent screen surface 5 as shown in Fig. 2. However, my invention is not limited to the use of a particular type of reference lines or scale markings to the exclusion of scale markings such as oblique coordinates or polar coordinates or marks designed merely for a linear scale, or merely a zero mark or reference line, which would be formed by a single slit or aperture in the object 3.

I prefer to have the object 3 and the image thereof on the fluorescent screen surface 5 located in non-parallel planes in order to permit projecting image producing light beams of maximum intensity upon the fluorescent screen 5 and to reduce to a minimum the angle of incidence between the light beams and the plane of the optical object 3.

In order to facilitate distinguishing the luminous spot S produced by the cathode ray beam and the reference marks 7 produced by the light source 2, I find it convenient to utilize colored light for producing the projected scale reference line means. This may be accomplished by means of a colored light source or by interposing one or more color filters 8 in the optical path between the light source 2 and the fluorescent screen surface 5. If desired, various color filters of different colors such as red, green and purple may be provided in the regions intercepting light beams corresponding to different portions of the scale 7 in order that measured values falling within different ranges will be distinguished by different colors as in the manner of the light-beam electromagnetic instrument described in Patent No. 1,894,111, Marcellus.

In the case of cathode ray tubes having a plurality of light beams, such color filters may also be employed for distinguishing the scale region of one cathode ray beam from that of another.

Since the scales of reference-line means 7 are projected on to the fluorescent screen 5 from outside the tube, the arrangement permits readily moving the scales, adjusting them, or calibrating them as well as interchanging various types of scales or providing scales of different types or having different scale divisions at different portions of the surface of the fluorescent screen 5 in the case of cathode ray tubes having a plurality of beams. Interchangeability of scales may be accomplished readily, for example, by utilizing for the optical object 3 interchangeable transparent scale disks having suitable opaque scales marked thereon and providing a suitable spring-clip frame 9 in which said scale disks may be inserted, as illustrated in Fig. 3, where a transparent disk 10, bearing a polar-coordinate scale 11, is shown held in place in the jaws 12 by a spring 13.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. An electron beam instrument comprising an evacuated envelope with transparent walls adapted to have a cathode ray beam produced in the envelope, a fluorescent screen on the inner surface of one wall of the envelope, and means for projecting reference-line means on to said fluorescent screen, said projecting means comprising an optical object lying along a plane other than parallel with the said screen, a light source for illuminating the optical object, and means for focusing an image of the object on the said fluorescent screen, said projecting means being located outside and to one side of said envelope and projecting such image through a side wall of the envelope onto the inner surface of the screen.

2. An arrangement for providing reference-line means on a screen of an electron beam tube which comprises an optical object outside the tube with which it is to be used, a light source outside the tube for illuminating the optical object, means for projecting an image of the optical object through the tube on to said screen, said optical object having the configuration desired for the reference line means, and a color filter interposed in the optical path between said optical object and the said screen in order to produce reference line means distinguishable in color from the spot produced on the screen by an electron beam.

3. An electron beam instrument comprising an evacuated envelope with transparent walls adapted to have a cathode ray beam produced in the envelope, a fluorescent screen on the inner surface of one wall of the envelope, and means for projecting reference line means on to said fluorescent screen, said protecting means comprising a disk holder, a set of interchangeable transparent disks fitting said disk holder, each of said disks having opaque lines marked thereon to form coordinates, said disks including a disk with polar coordinate markings and a disk with rectangular coordinate markings, a light source for illuminating the transparent disk mounted in said disk holder, and means for focusing an image of the disk markings on said fluorescent screen.

ALFRED BIGALKE.